United States Patent [19]

Enning et al.

[11] Patent Number: 5,372,400
[45] Date of Patent: Dec. 13, 1994

[54] WELDED JOINT BETWEEN SUBSTANTIALLY MUTUALLY PERPENDICULAR SUPPORTING FRAME COMPONENTS OF A VEHICLE BODYWORK

[75] Inventors: Norbert Enning, Denkendorf; Heinrich Timm, Ingolstadt, both of Germany

[73] Assignee: Audi AG, Ingolstadt, Germany

[21] Appl. No.: 39,377
[22] PCT Filed: Nov. 8, 1991
[86] PCT No.: PCT/EP91/02116
§ 371 Date: Apr. 20, 1993
§ 102(e) Date: Apr. 20, 1993
[87] PCT Pub. No.: WO92/11169
PCT Pub. Date: Jul. 9, 1992

[30] Foreign Application Priority Data

Dec. 20, 1990 [DE] Germany ............... 4040946

[51] Int. Cl.⁵ ..................... B62D 25/00
[52] U.S. Cl. ............... 296/203; 296/209; 296/29
[58] Field of Search ............ 296/209, 29, 30, 203, 296/205; 52/655.1; 403/270, 271, 272, 263, 347

[56] References Cited

U.S. PATENT DOCUMENTS

| | | | |
|---|---|---|---|
| 2,389,907 | 11/1945 | Helmuth | 296/29 X |
| 3,292,969 | 12/1966 | Eggert, Jr. | 296/205 |
| 3,347,175 | 10/1967 | Butcher | 296/209 X |
| 4,462,629 | 7/1984 | Todori et al. | 296/30 |
| 4,618,163 | 10/1986 | Hasler et al. | 296/205 X |
| 5,094,504 | 3/1992 | Wurl | 296/29 X |
| 5,201,566 | 4/1993 | Mori | 296/209 X |

FOREIGN PATENT DOCUMENTS

| | | |
|---|---|---|
| 0146716 | 12/1988 | European Pat. Off. . |
| 0452318 | 10/1927 | Germany . |
| 0595854 | 4/1934 | Germany . |
| 1430673 | 7/1968 | Germany . |
| 2128281 | 12/1971 | Germany . |
| 2751753 | 10/1979 | Germany . |
| 3008840 | 12/1980 | Germany . |
| 3440656 | 12/1985 | Germany . |
| 3541924 | 6/1987 | Germany . |
| 3700131 | 7/1987 | Germany . |
| 3423967 | 10/1990 | Germany . |
| 1204868 | 11/1989 | Japan . |
| 4221276 | 8/1992 | Japan | 296/209 |
| 0608997 | 2/1979 | Switzerland . |

OTHER PUBLICATIONS (E1) Ruge, J., "Handbuch der Schweisstechnik", Springer-Verlag, 1985, pp. 215, 216, 219, 222–226, 314–315.
(E2) Suppus, H., "Der Fahrzeugaufbau aus Leichtmetall", Verlag der Aluminium-Zentrale e.v., Düsseldorf, 1953, Tafel 15.
(E3) Klock, H., Schoer, H., "Schweissen und Löten von Aluminium-Werkstoffen", Deutscher Verlag für Schweisstechnik GmbH, Düsseldorf, 1977, p. 139.
Schweizer Aluminium Runderschau (SAR), "Erfahrungen mit dem neuen Autobussystem M5438", 1983, pp. 196–201.
(E4) Pippert, H., "Karosserietechnik", Vogel Buchverlag, Würzburg, 1989, p. 139.

*Primary Examiner*—Joseph Pape
*Attorney, Agent, or Firm*—Jacques M. Dulin

[57] ABSTRACT

The invention concerns an improved welded joint in a vehicle bodywork for connecting two mutually perpendicular extruded aluminum pieces such as a longitudinal bearer or sill and an upstanding B post. According to the invention, the bottom end of the B post is inserted within an opening in the sill for a positive locking engagement and includes a transverse weld seam which connects the B post to the opening along a first outward facing wall portion of the B post. In addition, a connecting member in the form of a flat plate is placed along the inward facing wall of the B post and is joined at a vertical side edge to the B post by a first weld seam and has a bottom side edge oriented flush with the upper sill surface in the lengthwise direction of the sill and is joined thereto by a second weld seam. The welded connection of the two mutually perpendicular aluminum frame members through the use of a separate plate provides a simple and economical solution which ensures a positive and strong connection in the transverse direction of the vertical member and overcomes the problems of material weakening from thermal influences of a completely surrounding transverse weld connection.

6 Claims, 1 Drawing Sheet

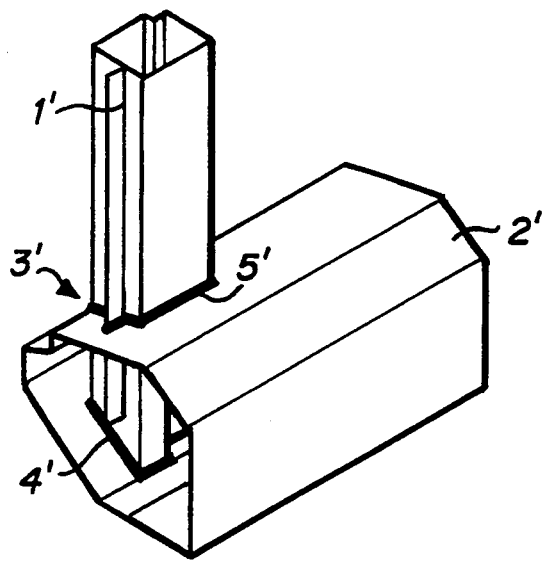
Fig._1 (PRIOR ART)
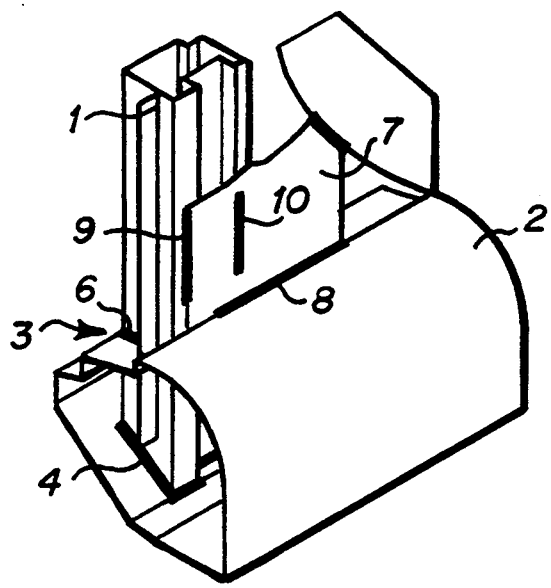
Fig._2

WELDED JOINT BETWEEN SUBSTANTIALLY MUTUALLY PERPENDICULAR SUPPORTING FRAME COMPONENTS OF A VEHICLE BODYWORK

BACKGROUND

From European patent document EP-PS 0 146 716 it is known how to construct the supporting structure of a vehicle body by using node connectors to join together a plurality of extruded aluminum frame sections. The node connectors are formed as cast light metal pieces. Depending upon the node connection location, the ends of the extruded aluminum sections are secured to the cast node elements by mounting on a specially molded support surface or are received within a shell enclosure and are then welded in place. For certain connecting regions, such as for example where two extruded aluminum sections are in a substantially, mutually perpendicular abutment with one another, it is advisable and more economical to make a direct connection without using the cast node connectors.

In the case of heat treatable aluminum alloys, it is well known that thermal welding produces a considerable decrease in the strength of the welded aluminum piece immediately adjacent the weld seam in the so-called "zone of thermal influence." In particular, a welded joint oriented in a transverse direction with respect to an extruded aluminum section is particularly critical since the weld weakens the extruded aluminum section in the transverse plane passing through it. Such joints may fail and be torn off at heavily loaded connection points, especially during an impact to the vehicle where extremely high load conditions are present.

It is also known from European patent document EP-PS 0 146 716 how to join the B post or B pillar directly to the sill of the vehicle where both frame elements are formed as extruded aluminum sections. A surrounding weld seam applied in the usual manner is not desirable here since this joint is particularly vulnerable to a side impact and the resulting strength reduction presents a danger that the B post will be torn off at the joint connection with the sill. Accordingly, in order to avoid weakness in the transverse direction of the B post, a surrounding transverse weld seam should be avoided. However, a weld seam joining the B post to the sill in the interior of the vehicle is essential for reasons of rigidity and for increasing fatigue strength since this area of the joint is subjected to extremely high load conditions.

German patent document DE 21 28 281 discloses a welded joint between two extruded aluminum sections which are fitted together at an angle whereby one or more substantially triangular side pieces are fitted to the corner regions formed by the two extruded aluminum sections. The triangular piece is butt-welded in place along adjacent lengthwise edges of the two extruded aluminum sections. Moreover, the outer bearing edges of the flush-mounted triangular pieces are also butt-welded to each of the two extruded aluminum sections. Such a welded joint, while adequate for support in a vertical plane, is of limited use for the extremely heavy loads associated with a side impact at the joint between the sill and the B post since it does not surround the piece in the transverse direction.

Accordingly, there is a definite need in the art for a T-shaped welded joint connection between two mutually perpendicular extruded aluminum hollow section members, such as a longitudinal sill member and an upstanding B post, which is capable of withstanding heavy side loads.

THE INVENTION

DRAWINGS

The invention is best understood by reference to the drawings in which:

FIG. 1 is an isometric view of a prior art joint connection showing a surrounding transverse weld seam between two aluminum bearers; and FIG. 2 is an isometric view of a welded joint connection between two mutually perpendicular aluminum bearers constructed in accordance with a preferred embodiment of the present invention.

SUMMARY

According to the invention, a generally upright aluminum bearer such as a B post of a vehicle body is inserted within an opening in the top wall of the lengthwise aluminum frame member or sill. The B post extends through the hollow interior of the sill and terminates in abutment with an inner bottom sill wall to achieve a positive locking engagement. A first transverse weld seam joins an outward facing wall of the B post to the upper wall of the sill at the opening. A connection piece is used to join the inward facing wall of the B post to the sill by at least two spaced apart weld seams.

In a preferred embodiment of the invention, the connection piece is formed as a plate member having a side edge which lies against the B post and a bottom edge disposed flush against the upper surface of the sill and traveling in a lengthwise direction thereof. The respective weld seams are placed at the side and bottom edges. It is advantageous to leave a spacing between the weld seams so that the zones of thermal influence from the welding do not immediately adjoin or overlap each other.

The combination of the positive-locking insert connection of the specified arrangement and the spacing distance of the weld seams provide a dramatic increase in the rigidity and strength at the critical joint connection between the sill and B post.

As a result, weaknesses caused by weld seams connecting the B post to the sill do not directly adjoin each other. In particular, the problem of the unfavorable surrounding weak spot, commonly found in the prior art welded joint connections, is overcome. In addition, as compared to transversely oriented weld seams, the weld seams situated in the lengthwise direction of the B post are much less critical in terms of strength. The plate-like connection element lying against the B post at the inside of the vehicle, in conjunction with the generally mutually perpendicular orientation of the spacing between the weld seams, results in a stable assemblage of parts which also substantially limits the penetration of objects into the passenger space. Thus, the improved welded joint of the present invention makes an important contribution to the stability of the passenger space in the particularly vulnerable side region. Furthermore, this high stability and strength is achieved by simple means and measures in an economical assembly.

A further increase in strength of the joint connection is achieved by joining the bottom abutting end of the B post to the inner bottom wall of the sill by a fourth, and preferably surrounding, weld seam. The plate-like connection piece can also be made from aluminum alloy.

When the welded joint of the invention is used in the body structure of a vehicle, an enhanced rigidity and strength are achieved, especially for connection points which must withstand a heavy load during an impact without ripping off.

A further improvement for the joint stability may be achieved by providing an additional weld seam in a lengthwise slot, provided to the plate-like connection piece, possibly as an addition to either one or both of the side and bottom edge weld seams.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows an example of a prior art welded joint connection between two extruded aluminum bearers 1' and 2' of a vehicle bodywork. In this example, aluminum bearer 1' represents a B post or B pillar of a vehicle bodywork while the transversely and horizontally disposed second aluminum bearer 2' represents a part of the sill of a vehicle.

A conventional and familiar joint between the B post 1' and the sill 2' is made by the positive locking insertion of the B post 1' within an opening 3' in the larger section of the sill 2'. The B post 1' is connected at its lower end to the inside bottom wall of the sill 1' by means of a weld seam 4'. An additional connection is produced by a weld seam 5' which connects the B post 1' to the sill 2' along the perimeter of the opening 3' formed in an upper surface of the sill 2'.

As will be appreciated by those having skill in the art, when heat treated extruded aluminum alloy bearers are used, this surrounding transverse weld results in a surrounding weak spot, due to the considerable decrease in strength caused by the welding process.

FIG. 2 shows an improved welded joint connection between a B post 1 and a sill 2 of a vehicle constructed in accordance with one embodiment of the present invention. Once again, the B post 1 is inserted within an opening 3 of the sill 2 to achieve a positive locking engagement. The B post 1 is also joined at its bottom end to the bottom wall of the sill 2 by means of a weld seam 4.

However, unlike the welded joint connection of the prior art, there is no surrounding transverse weld seam in the region of the opening 3. The B post 1 is connected to the sill 2 in the region of the opening 3 along an outward facing surface thereof (i.e., along a surface of the B post oriented along the outside of the vehicle) by means of a weld seam 6. As is seen in FIG. 2, the weld seam 6, if desired, may also be continued somewhat around and along the side regions of the B post 2.

The conventional transverse weld 5' of the prior art, (FIG. 1) is replaced by a plate-like connection piece 7 which joins the B post 1 to the sill 2 along its inward facing surface (i.e., that portion of the B post which faces the passenger compartment) and is positioned with one bottom edge mounted flush in the lengthwise direction of the sill 2 and is joined thereto by a weld seam 8. The vertical side edge of the connection piece 7 is used as a bearing edge, oriented lengthwise to the B post 1 and is connected to the B post 1 by weld seam 9. For increased strength of the joint, an additional weld seam 10 is preferably placed parallel to weld seam 9 at a lengthwise slot formed in the connection piece 7 as shown. The weld seams 6, 8, 9 and 10 are preferably spaced apart from each other at sufficient distances to ensure that the critical zones of thermal influence associated with each weld seam which result from the welding process do not touch or overlap each other.

Thus, the welded joint of the invention as above described results in a tough weld connection between an aluminum bearer and a structural piece connected thereto which is both simple and economical to construct.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A welded joint connection between two mutually, substantially perpendicular extruded light metal hollow-bodied sections comprising in operative combination:
   a) a first horizontally oriented hollow-bodied section member having an opening along an upper surface thereof;
   b) a second substantially vertically oriented hollow-bodied section member having an inward facing side wall and an outward facing side wall and one end portion receivingly engaged within said opening of said first section member;
   c) a connection piece disposed adjacent said opening, said connection piece having a vertical side surface joined to said inward facing side wall of said second section member by a first weld seam, and a horizontal bottom surface disposed flush with, and in the lengthwise direction of, said upper surface of said first section member and joined thereto by a second weld seam;
   d) a third transverse weld seam for joining said outward facing side wall of said second section member to said first section member at said opening; and
   e) said first, second and third weld seams being spaced sufficiently apart from one another such that each respective zone of thermal influence associated with said first, second and third weld seams do not touch or overlap one another.

2. A welded joint connection as in claim 1 for use in a motor vehicle bodywork wherein said first section member is a longitudinal bearer member and said second section member is a B post.

3. A welded joint connection as in claim 1 wherein said connection piece is a plate-like member which lays substantially flat against said inward facing side wall of said second section member and includes at least one slot for receiving a fourth weld seam for joining said connector piece to said second section member.

4. A welded joint connection as in claim 3 wherein said one end portion of said second section member includes a terminal end abutting against a bottom inner wall of said first section member and is connected thereto by a fifth weld seam.

5. A welded joint connection as in claim 2 wherein said connection piece is a plate-like member which lays substantially flat against said inward facing side wall of said second section member and includes at least one slot for receiving a fourth weld seam for joining said connector piece to said second section member.

6. A welded joint connection as in claim 5 wherein said one end portion of said second section member includes a terminal end abutting against a bottom inner wall of said first section member and is connected thereto by a fifth weld seam.

* * * * *